United States Patent [19]

Inokoshi

[11] Patent Number: 5,525,972

[45] Date of Patent: Jun. 11, 1996

[54] ADJUSTING DEVICE FOR RADIO CONTROL TRANSMITTER

[75] Inventor: Satoshi Inokoshi, Mobara, Japan

[73] Assignee: Futaba Denshi Kogyo K.K., Mobara, Japan

[21] Appl. No.: 251,203

[22] Filed: May 31, 1994

[30] Foreign Application Priority Data

May 31, 1993 [JP] Japan .................................. 5-149913

[51] Int. Cl.[6] ................................................ H04B 7/00
[52] U.S. Cl. ........................ 340/825.220; 340/825.720
[58] Field of Search ........................ 340/825.22, 825.69, 340/825.72, 870.04; 73/1 R; 446/154, 454–456; 244/189; 114/144 A; 364/571.01

[56] References Cited

U.S. PATENT DOCUMENTS

| 4,099,240 | 7/1978 | Rode et al. | 340/870.04 |
| 4,177,426 | 12/1979 | Gaishin et al. | 340/825.69 |
| 4,897,884 | 1/1990 | Heller | 340/870.04 |
| 4,929,949 | 5/1990 | Yamamoto et al. | 340/825.72 |
| 5,049,863 | 9/1991 | Oku | 364/709.01 |

FOREIGN PATENT DOCUMENTS

| 3833841 | 4/1990 | Germany | 446/456 |

*Primary Examiner*—Michael Horabik
*Attorney, Agent, or Firm*—Oblon, Spivak, McClelland, Maier & Neustadt

[57] ABSTRACT

An adjusting device for a radio control transmitter capable of adjusting the amount of operation of a model with respect to the amount of operation of a stick of the radio control transmitter during controlling of the model by the transmitter while confirming operation of the model. An adjusting section of a first radio control transmitter for control of a model is connected through a cable to an adjusting section of a second radio control transmitter which adjusts the amount of operation of the model with respect to the amount of operation of a stick of the first transmitter, so that an adjusting operation by the adjusting section of the second transmitter leads to adjustment of the first transmitter which is controlling the model.

4 Claims, 7 Drawing Sheets

RST

ADJUSTING DEVICE FOR RADIO CONTROL TRANSMITTER

BACKGROUND OF THE INVENTION

This invention relates to an adjusting device for a radio control transmitter adapted to adjust the amount of operation of a model with respect to the amount of operation of a stick of the radio control transmitter, and more particularly to an adjusting device suitable for use for a radio control transmitter which is capable of adjusting a model while controlling it.

Control of a model is generally carried out by operating a stick or a switch provided on a radio control transmitter. In the control, a relationship between the amount of operation of the stick and the amount of amount of operation of the model controlled by the radio control transmitter is varied not only depending on the model but every time when the control is carried out even if the same model is operated. Also, the amount of operation of the model is varied depending on an operator.

In view of the above, a radio control transmitter which is constructed so as to permit the amount of operation of a model to be adjusted with respect to the amount of operation of a stick has been recently rendered commercially available.

Also, development of a multifunctional radio control transmitter for controlling a model airplane or a model helicopter which is adapted to exhibit multiple function characteristics has been extensively carried out. The radio control transmitter is constructed so as to permit the amount of operation of a model to be adjusted with respect to the amount of operation of a stick for each of the functions.

For example, in control of a model airplane, individual adjustment of an angle of each of ailerons of the model airplane leads to aileron differential for correcting a roll shaft, adjustment of the amount of aileron-rudder mixing for associating an operation of a rudder with an operation of the aileron, adjustment of the amount of rudder-aileron mixing for associating an operation of the aileron with an operation of the rudder, adjustment of the amount of elevator-flaperon mixing for associating an operation of flaperon with an operation of an elevator, adjustment of a throttle curve, and the like.

A radio control transmitter for carrying out the above-described adjustments may be constructed, for example, in such a manner as shown in FIG. 6.

More particularly, in FIG. 6, reference numeral 1 designates a transmitter body 1, which includes a display unit 2 such as, for example, an LCD for displaying an image through which a setting operation is carried out, soft keys 3 operated for carrying out the setting operation, a stick 4 for controlling a model, a rod antenna 5, a power supply switch 6 and a trim 7 for adjusting the mount of trimming.

Now, an adjusting operation by the radio control transmitter constructed as described above will be described with reference to FIGS. 7(a) and 7(b) in connection with adjustment of a throttle curve in control of a model helicopter by way of example. FIGS. 7(a) and 7(b) show only the display unit 2 and the soft keys 3 arranged around the display unit 2 for the sake of brevity.

First, an image of a helicopter condition menu shown in FIG. 7(a) is indicated on the display unit 2. Then, of the soft keys 3 arranged around the display unit 2, a key C is first pushed or operated and then a key I is operated. This results in an image which permits characteristics of a throttle curve TVC to be adjusted being selected, so that an image shown in FIG. 7(b) being indicated on the display unit 2.

Then, a soft key B is operated and then soft keys Q and R are operated, so that a point desired to be set may be selected in the image thus indicated. The point selected is a point corresponding to the amount of operation of a stick indicated by an axis of abscissas in a throttle characteristic chart 3-1 displayed on the display unit 2. After the point to be set is selected, soft keys E to M are operated to set the point so that a rate of the point takes a desired value. An indication "RST" for the key E designates a key operated when the rate is returned to the original state.

After setting of the selected point is completed, the next point is selected, resulting in a rate of each of the points being set so that a desired throttle curve may be obtained. After completion of the setting, an indication "END" for a key N is operated, so that an operation of adjusting the throttle curve in the radio control transmitter is completed.

Adjustment of the radio control transmitter described above is generally carried out on the ground. Then, an operation of causing a model helicopter to fly in the air is carried out to confirm results of the adjustment. When readjustment is then required, the model helicopter is landed, resulting in the readjustment being executed.

Thus, it is required to repeat flying and landing of the model helicopter many times depending on a way of executing adjustment of the radio control transmitter, therefore, the adjustment is highly troublesome and time-consuming.

For the purpose of permitting adjustment of the radio control transmitter to be carried out in a short period of time, it would be considered to execute the adjustment while keeping the model helicopter flying. However, to this end, it is required that an additional person other than an operator who controls the model helicopter executes adjustment of the radio control transmitter, because the operator cannot loose his hold of the stick of the radio control transmitter.

Unfortunately, the conventional radio control transmitter, as shown in FIG. 6, is so constructed that the stick for control and the display unit are arranged in proximity to each other; therefore, the adjustment by the additional person while visually observing an image on the display unit interferes with the operator who is operating the stick, so that the operator fails to properly control the stick during the adjustment. Thus, the conventional radio control transmitter fails to permit the adjustment to be executed while keeping the model helicopter flying.

SUMMARY OF THE INVENTION

The present invention has been made in view of the foregoing disadvantage of the prior art.

Accordingly, it is an object of the present invention to provide a radio control transmitter which is capable of permitting an operator to adjust the amount of operation of a model in relation to the amount of operation of a stick of the radio control transmitter without any control error while keeping the model operated or flying.

In accordance with the present invention, an adjusting device for a radio control transmitter is provided. The adjusting device includes a connector provided on the radio control transmitter and a cable connected at one end thereof to the connector and at the other end thereof to a radio control device for adjusting the amount of operation of a model with respect to the amount of operation of a stick of the radio control transmitter, whereby the amount of operation of the model with respect to the amount of operation of the stick of the radio control transmitter during control of the model is adjusted by means of the radio control device.

Also, in accordance with the present invention, an adjusting device for a radio control transmitter is provided. The adjusting device includes a display unit for indicating an adjustment setting image through which adjustment of the amount of operation of a model with respect to the amount of operation of a stick of the radio control transmitter is carried out and a setting section provided with an adjusting button means through which selection of an image indicated on the display unit and the above-described adjustment are carried out. The setting section is arranged so as to be detached from the radio control transmitter while keeping connected to the radio control transmitter.

In a preferred embodiment of the present invention, the setting section and radio control transmitter are connected to each other by means of infrared rays.

Further, in accordance with the present invention, an adjusting device for a radio control transmitter is provided. The adjusting device includes an infrared receiving section provided on the radio control transmitter, wherein the amount of operation of a model with respect to the amount of operation of a stick of the radio control transmitter during control of the model is adjusted by operating of an infrared remote control transmitter.

In the present invention constructed as described above, the additional radio control device other than the radio control transmitter for controlling a model is used for adjusting the amount of operation of the model with respect to the amount of operation of the stick of the radio control transmitter.

Also, the present invention permits the adjusting section of the radio control transmitter to be detachably mounted on a body of the radio control transmitter. The adjusting section may comprise the display unit and soft keys.

Thus, the present invention permits adjustment of the amount of operation of the model with respect to the amount of operation of the stick to be accomplished with respect to the radio control transmitter which is controlling the model.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
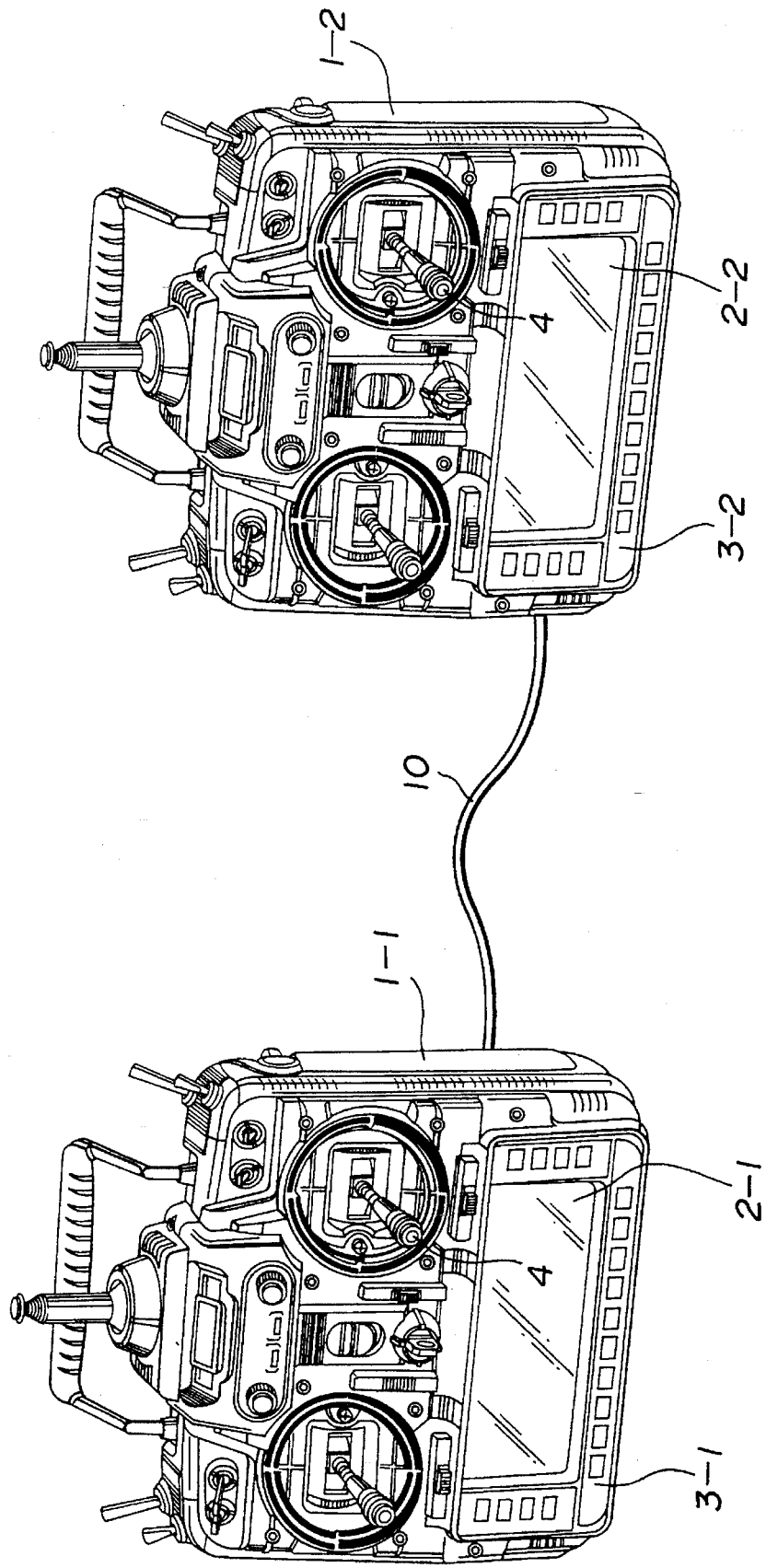
FIG. 1 is a perspective view showing a first embodiment of an adjusting device for a radio control transmitter according to the present invention.

Now, an adjusting device for a radio control transmitter according to the present invention will be described hereinafter with reference to FIGS. 1 to 5, wherein like reference numerals designate like or corresponding parts throughout.

Referring first to FIG. 1, a first embodiment of an adjusting device for a radio control transmitter according to the present invention. In FIG. 1, reference numeral 1-1 designates a radio control transmitter for controlling a model, 1-2 is a radio control transmitter for adjusting the radio control transmitter 1-1, 2-1 and 2-2 each are a display unit arranged on each of the radio control transmitters 1-1 and 1-2 for displaying an image for adjustment, 3-1 and 3-2 each are soft keys arranged for carrying out operation of each of the display units 3-1 and 3-2 and adjustment thereof, 10 is a cable for connecting an adjusting section of the radio control transmitter 1-1 and that of the radio control transmitter 1-2 to each other therethrough.

In the illustrated embodiment constructed as described above, when the amount of operation of a model is to be adjusted in the midst of control of the model by means of the radio control transmitter 1-1, the cable 10 is connected at one end thereof to a connector provided on a suitable portion of the radio control transmitter 1-1 such as a rear surface thereof and at the other end thereof to a connector provided on a suitable portion of the radio control transmitter 1-2 such as a rear surface thereof. The connectors each are drawn out of an adjusting section of each of the radio control transmitters 1-1 and 1-2.

Then, soft keys 3-2 arranged around the display unit 2-2 of the radio control transmitter 1-2 are operated to permit a condition menu to be indicated on the display unit 2-2, followed by selection of a mode desired to be adjusted.

Thereafter, the soft keys 2-2 are operated to carry out adjustment of the mode with reference to the image indicated on the display unit, so that data on the adjustment are transmitted through the cable 10 to the radio control transmitter 1-1. The data thus transmitted permit adjustment of the mode which has been executed in the radio control transmitter 1-2 to be likewise carried out in the radio control transmitter 1-1.

After the adjustment is thus completed, the cable 10 is disconnected from the connectors, so that the illustrated embodiment is returned to the original state.

The cable 10 may be typically formed of two core wires for a power supply and eight core wires for transmitting the data for adjustment. Alternatively, it may be a serial data bus which meets the RS-232C Standard.

The above-described construction of the first embodiment permits the adjustment of operation of the model to be executed by means of the radio control transmitter 1-2 while controlling the model by means of the radio control transmitter 1-1, resulting in the adjustment being accomplished with ease and in a short period of time.

Now, each of the radio control transmitters 1-1 and 1-2 will be described with reference to FIG. 2.

Figure 2:
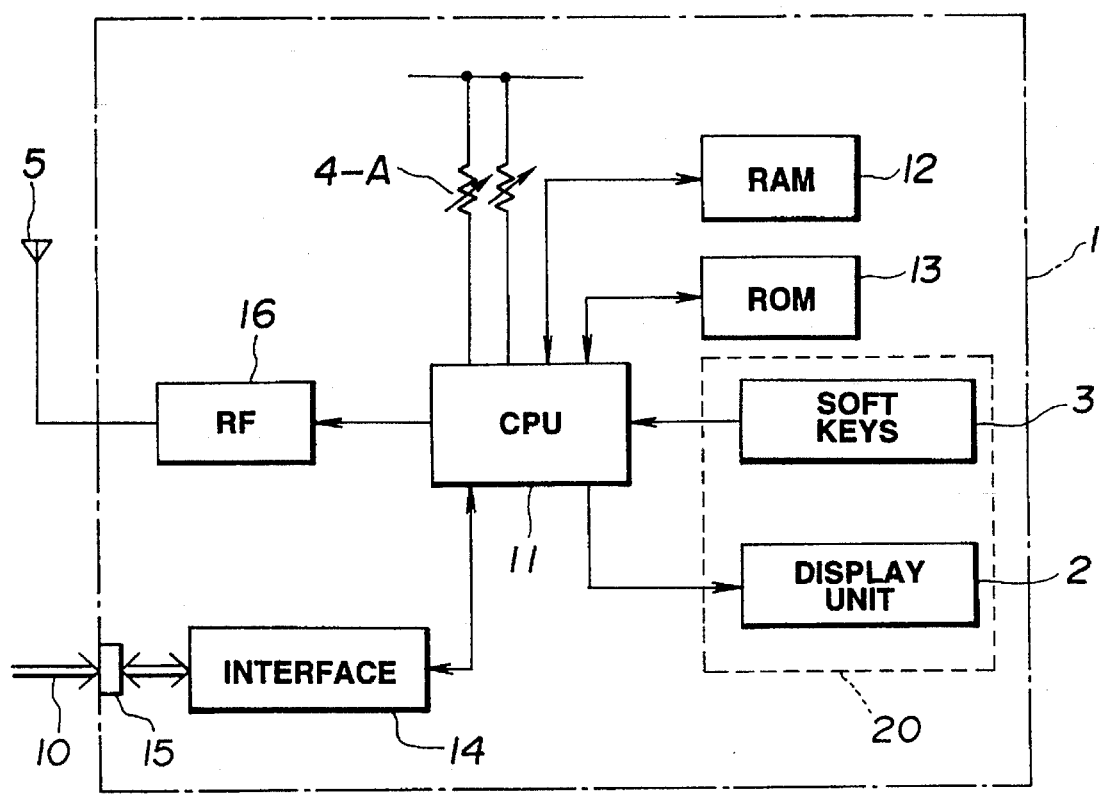
FIG. 2 is a block diagram of the radio control transmitter shown in FIG. 1.

In FIG. 2, reference numeral 1 designates a radio control transmitter which constitutes each of the transmitters 1-1 and 1-2, 2 is a display unit provided on the radio control transmitter 1 for indicating an image for adjustment or the like thereon, 3 designates soft keys through which operation of the display unit 2 and adjustment thereof are carried out, 4-A is a variable resistor arranged so as to be operated in association with each of sticks, 5 is a rod antenna, 10 is a cable through which the radio control transmitter 1 and another radio control transmitter are connected to each other, 11 is a microprocessor (CPU) for carrying out operations such as encoding of the amount of operation of each of the variable resistors 4-A operated in association with each of the sticks to feed it to a high-frequency circuit 16, control of memories 12 and 13, display of data on the display unit 2 and the like.

Further, the memory 12 comprises a random access memory (RAM) for storing therein data set by means of the soft keys 3 or the like and the memory 13 comprises a read-only memory (ROM) in which a command or the like is stored. Reference numeral 14 is an interface which permits data transmitted through the cable 10 connected to a connector 15 to be introduced into the CPU 11 therethrough. The high-frequency circuit 16 functions to modulate a signal encoded by the CPU 11. The modulated signal is then output in the form of a radio wave from the circuit 16. The cable 10 connects the adjusting section of the radio control transmitter 1-1 and the adjusting section of the radio control transmitter 1-2 to each other therethrough. Reference numeral 20 designates such an adjusting section of each of the radio control transmitters. In the illustrated embodiment, the adjusting section may comprise the display unit 2 and the soft keys 3.

Now, the manner of operation of the adjusting device of the illustrated embodiment constructed as described above will be described hereinafter with reference to FIG. 2.

When data for adjusting the amount of operation of a model with respect to the amount of operation of each of the sticks 4 is fed from the additional radio control transmitter through the cable 10 to the radio control transmitter 1, the data are then introduced through the connector 15 and then the interface 14 into the CPU 11, resulting in the throttle curve described above being adjusted depending on the data thus transmitted.

Data on the throttle curve thus adjusted are stored in the RAM 12. Then, supposing that the stick 4 for throttling is operated, the CPU 11 carries out encoding in correspondence to the amount of operation of the stick 4 based on the data on the adjusted throttle curve which are stored in the RAM 12, to thereby apply a signal of the encoding to the high-frequency circuit 16. Then, the amount of operation of the stick 4 is modulate and output in the form of a radio wave through the rod antenna 5. The radio wave thus output is then received by a receiver arranged on the model to cause a throttle of an engine mounted on the model to be controlled along the throttle curve adjusted.

When the additional radio control transmitter is to be adjusted by operating the radio control transmitter 1 connected through the cable 10 thereto, an image of a mode to be adjusted is indicated on the display unit 2, so that desired adjustment is carried out through the soft keys 3 in the mode displayed. This causes the data for adjustment to be transmitted through the cable 10 to the additional radio control transmitter, resulting in the data being introduced through the connector and interface of the additional radio control transmitter into the CPU 11, so that the CPU 11 operates in the same manner as described above so as to execute adjustment of the mode displayed on the display unit 2.

Figure 3:
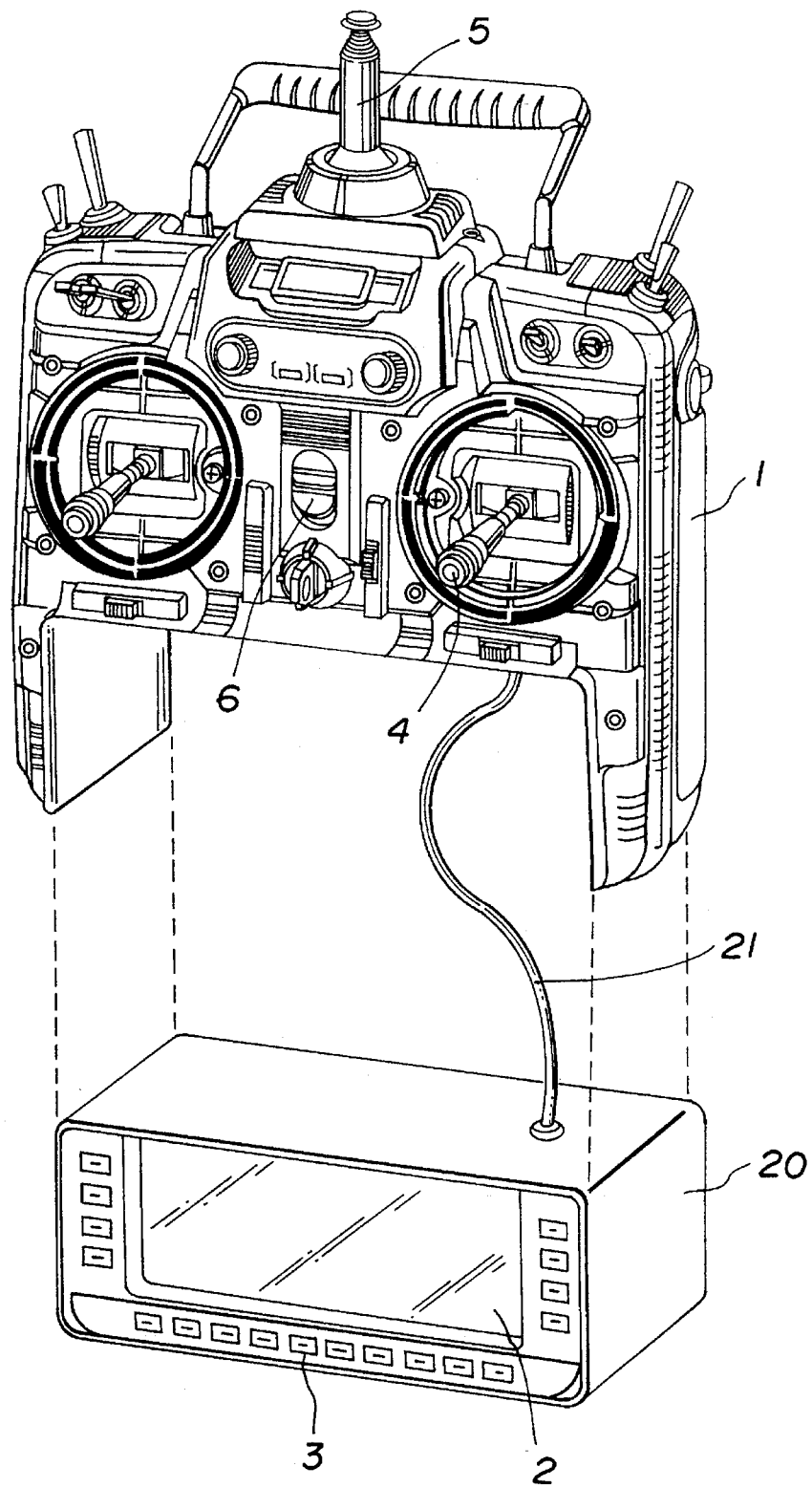
FIG. 3 is an exploded perspective view showing a second embodiment of an adjusting device for a radio control transmitter according to the present invention.

Referring now to FIG. 3, a second embodiment of an adjusting device for a radio control transmitter is illustrated.

In FIG. 3, reference numeral 1 designates a radio control transmitter. 2 is a display unit which constitutes a part of an adjusting section 20 of the radio control transmitter 1 and is arranged for indicating an image for adjustment thereon. 3 designates soft keys which constitute the adjusting section 20 in cooperation with the display unit 2 and are arranged around the display unit 2 so as to permit the adjustment to be carried out therethrough. 4 designates sticks each arranged for operating a model. 5 is a rod antenna for outputting a radio wave therethrough, 6 is a switch for a power supply and 21 is a cable through which the radio control transmitter 1 and the adjusting section 20 are connected to each other. The adjusting section 20 is detachably mounted on the radio control transmitter 1 for adjusting it.

Figure 6:
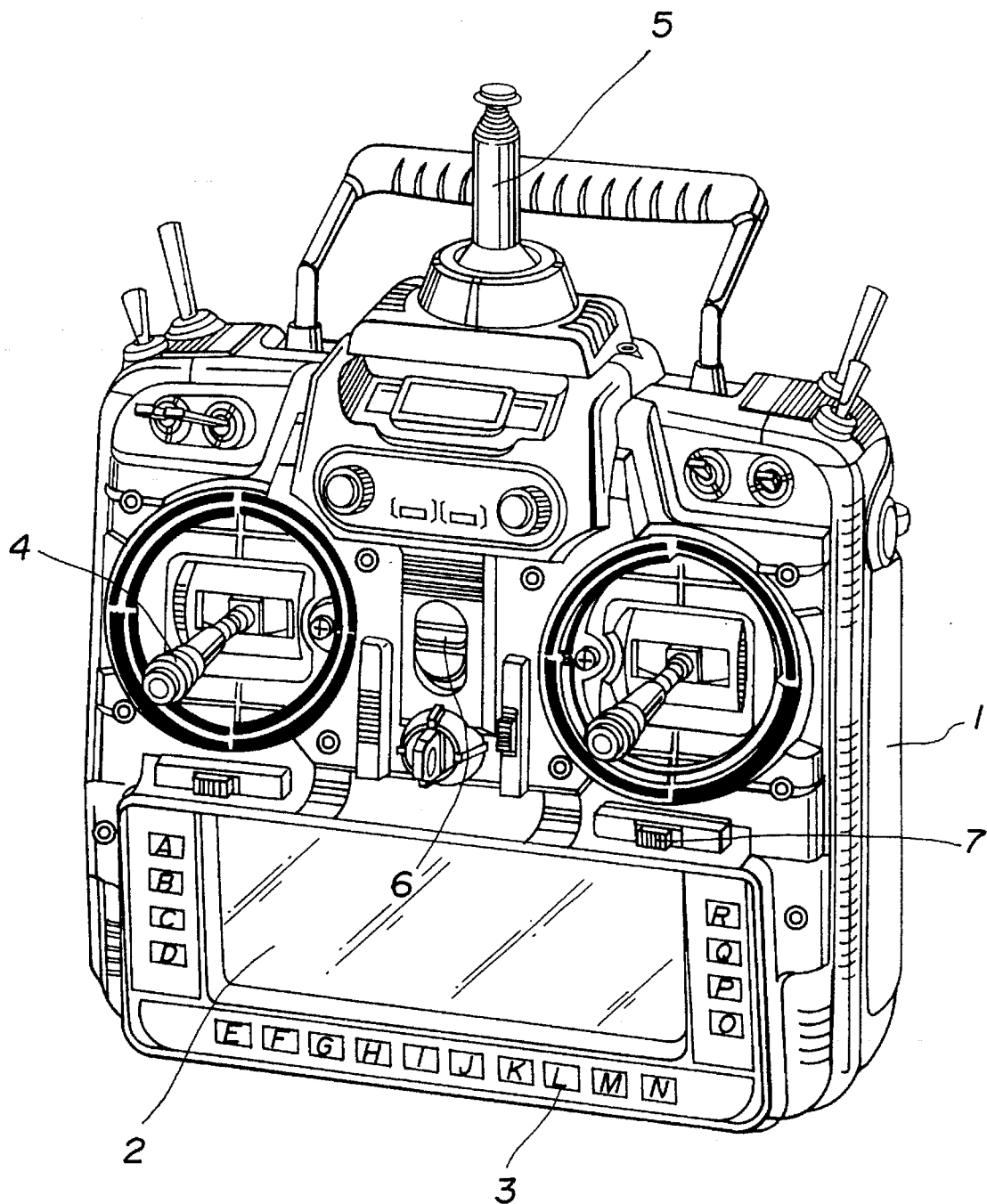
FIG. 6 is a perspective view showing a conventional radio control transmitter.
Figure 7A:
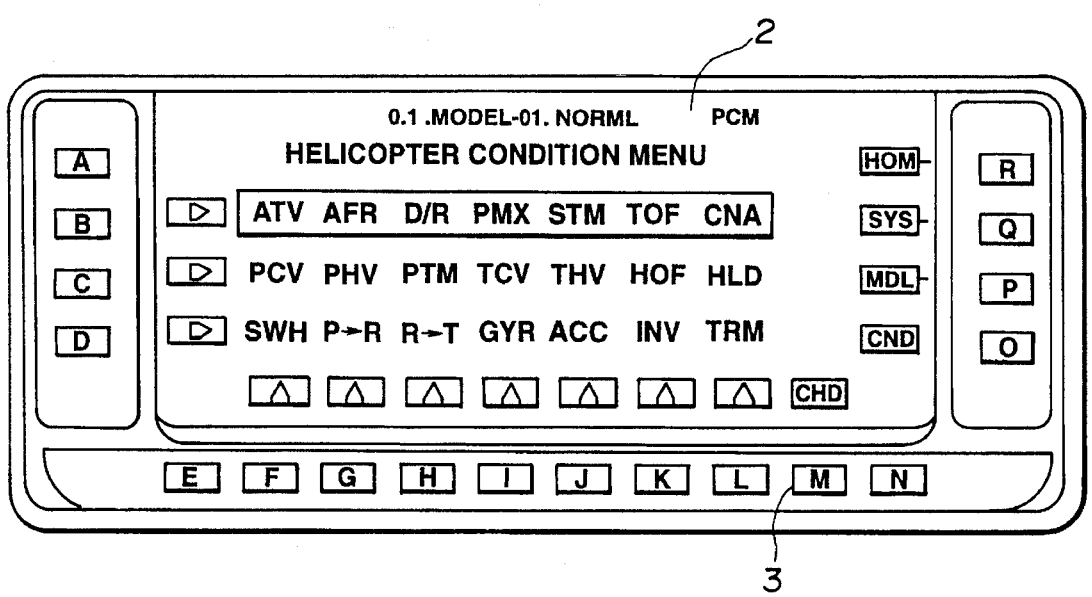
FIGS. 7(a) and 7(b) each are a schematic view showing an example of an image displayed on a display unit.
Figure 7B:
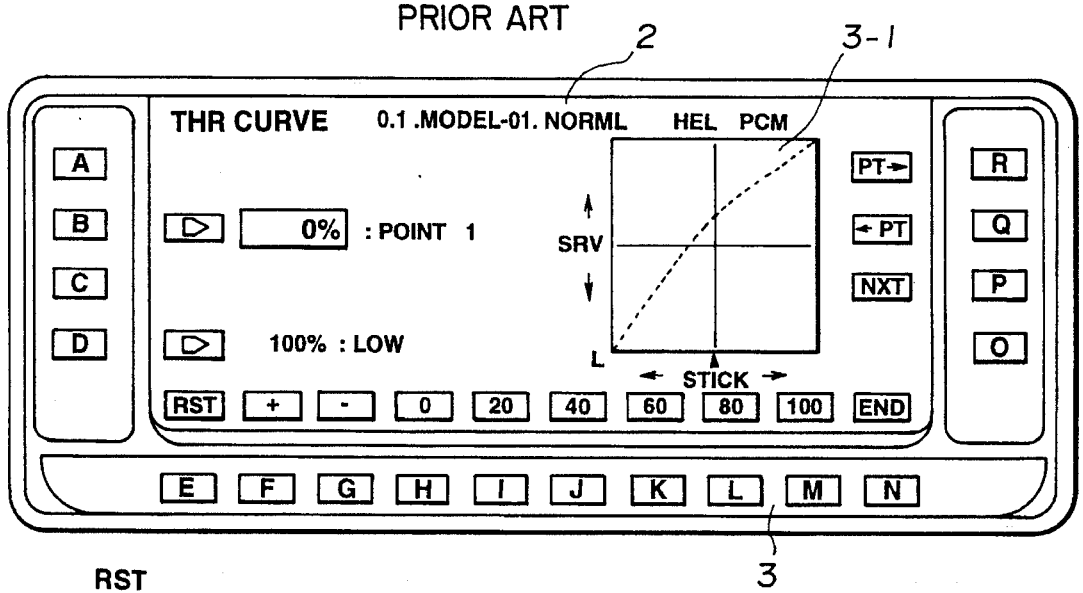

In FIG. 3, the adjusting section 20 is kept released from a body of the radio control transmitter 1. Fitting of the adjusting section 20 in a lower space defined in the body of the radio control transmitter permits the radio control transmitter 1 to have an outer configuration like that shown in FIG. 6.

In the second embodiment shown in FIG. 3, when the amount of operation of a model is to be adjusted in the midst of controlling the model by means of the radio control transmitter 1, an additional person who is to carry cut the adjustment other than an operator who is carrying out control of the model detaches the adjusting section 20 from the body of the radio control transmitter 1 as shown in FIG. 3 and then operates the soft keys 3 of the adjusting section 20 to display a condition menu on the display unit 2, followed by selection of a mode to be adjusted.

Then, the soft keys 3 arranged around the display unit 2 are operated to adjust the amount of operation of the model. The adjustment can be carried out in the midst of controlling the model, so that the amount of operation of the model may be accomplished while confirming the adjustment. After completion of the adjustment, the adjusting section 20 is fittedly received in the body of the radio control transmitter 1, to thereby be returned to the original state. The cable 21 is adapted to be received or stored in the body of the radio control transmitter 1 when the section 20 is received in the body.

When the cable 21 in the second embodiment is described with reference to FIG. 2 showing the first embodiment, it is arranged so as to connect the CPU 11 of the radio control transmitter 1 to the adjusting section 20 comprising the display unit 2 and soft keys 3. The cable 21 may be typically formed of ten core wires. Alternatively, transmission of data between the radio control transmitter 1 and the adjusting section 20 may be carried out by radio utilizing a radio wave, light beams or the like. In the latter case, transmission of the data for adjustment in the form of serial data permits a construction for the transmission to be simplified.

FIG. 2 may be likewise applied to the second embodiment except the interface 14 and connector 15 are eliminated.

Figure 4:
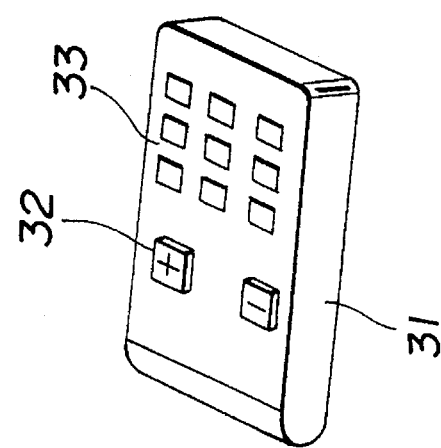
FIG. 4 is a perspective view showing a third embodiment of an adjusting device for a radio control transmitter according to the present invention.
Figure 4:
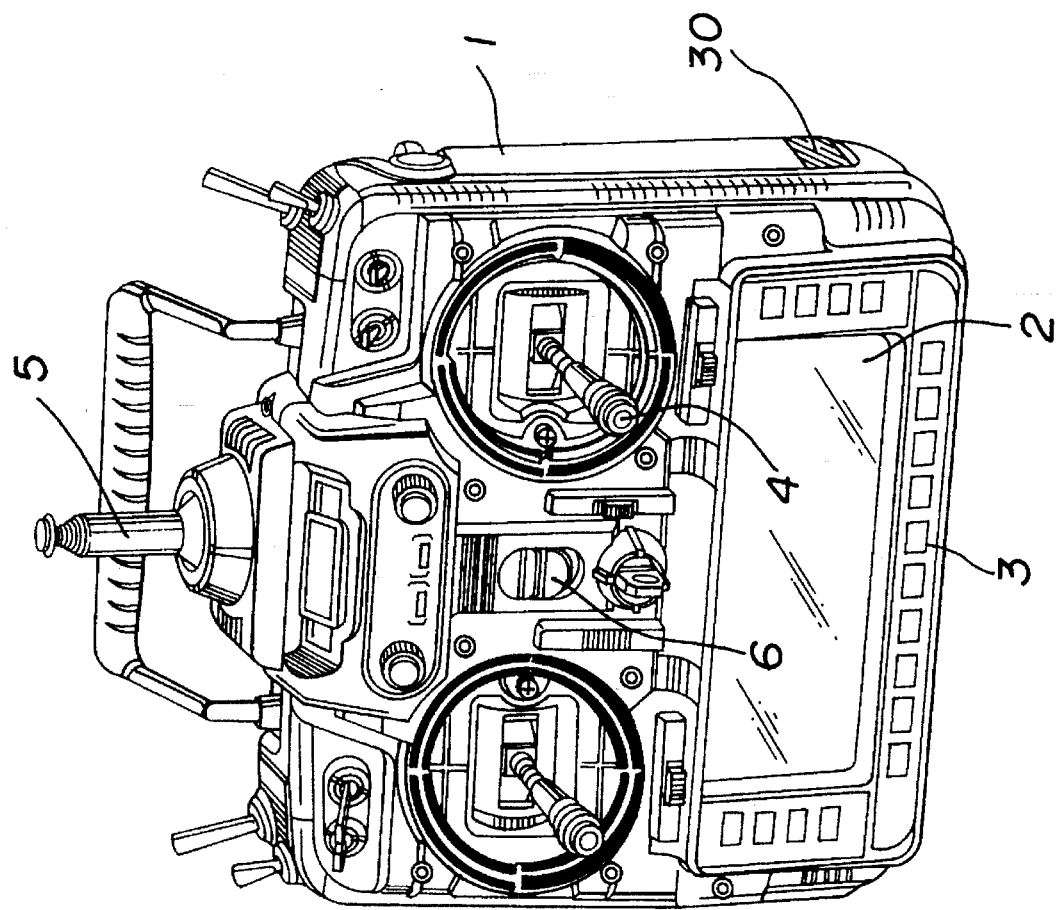

Referring now to FIG. 4, a third embodiment of an adjusting device for a radio control transmitter according to the present invention is illustrated. In FIG. 4, reference numeral 1 designates a radio control transmitter, 2 is a display unit for indicating an image for adjustment through which the radio control transmitter 1 is adjusted, and 3 designates soft keys for adjustment which are arranged around the display unit 2. 4 designates sticks for controlling a model, 5 is a rod antenna through which a radio wave is output, 6 is a switch for a power supply, 30 is a light receptor for receiving infrared rays output from a remote control transmitter 31 for carrying out adjustment of the radio control transmitter 1, 32 designates plus and minus keys provided on the remote control transmitter 31, and 33 designates keys provided on the remote control transmitter 31 for selecting a mode to be adjusted.

Now, the manner of operation of the third embodiment constructed as described above will be described hereinafter with reference to FIG. 4. When it is desired that the amount of operation of the model is adjusted in the midst of controlling the model while operating the sticks 4 by means of the radio control transmitter 1, an additional person who is to carry out adjustment other than an operator who is controlling the model operates the keys 33 of the remote control transmitter 31, so that the remote control transmitter 31 outputs infrared rays, which are then received by the light receptor 30 of the radio control transmitter 1.

Then, when the keys 33 of the remote control transmitter 31 are operated to select a mode to be adjusted, the mode is indicated on the display unit 2 of the radio control transmitter 1. Thereafter, the plus and minus keys 32 of the remote control transmitter 31 are operated, so that an increase or decrease in the amount of adjustment of the radio control transmitter 1 is carried out, resulting in the amount of operation of the model being adjusted as desired.

Thus, when the third embodiment is so constructed that the remote control transmitter 31 is provided with only the plus and minus keys 32 and mode selecting keys, the remote control transmitter 31 may be significantly simplified in construction.

Figure 5:
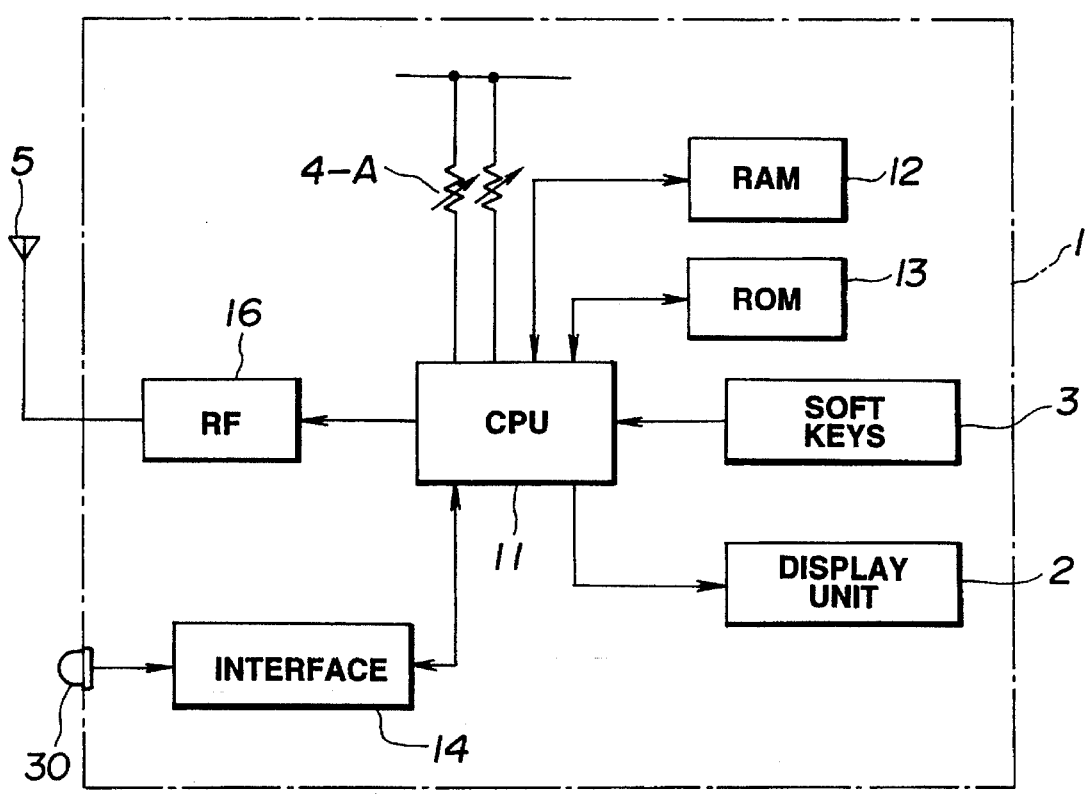
FIG. 5 is a block diagram of the radio control transmitter shown in FIG. 4.

The radio control transmitter of the third embodiment is shown in more detail in FIG. 5.

In FIG. 5, reference numeral 1 designates the radio control transmitter, 2 is the display unit provided on the radio control transmitter 1 for displaying an image for adjustment or the like thereon, 3 designates the soft keys through which operation of the display unit 2 and adjustment thereof are carried out, 4-A is a variable resistor arranged so as to be operated in association with each of the sticks 4, 5 is the rod antenna, 10 is a cable through which the radio control transmitter 1 and another radio control transmitter are connected to each other, 11 is a microprocessor (CPU) for carrying out operations such as encoding of the amount of operation of each of the variable resistors 4-A operated in association with each of the sticks 4 to feed it to a high-frequency circuit 16, control of memories 12 and 13, display of data on the display unit 2 and the like.

Further, the memory 12 comprises a random access memory (RAM) for storing therein data set by means of the soft keys 3 or the like and the memory 13 comprises a read-on memory (ROM) in which a command or the like is stored. Reference numeral 14 is an interface which permits data received by the light receptor 30 to be introduced into the CPU 11 therethrough. The high-frequency circuit 16 functions to modulate a signal encoded by the CPU 11, to thereby output the modulated signal in the form of a radio wave therefrom. The light receptor 30 functions to receive infrared ray data.

Now, the manner of operation of the third embodiment constructed as described above will be described hereinafter. When, for example, data for adjusting the amount of operation of a throttle of a model with respect to the amount of operation of the sticks 4 are fed as infrared data from the remote control transmitter to the radio control transmitter 1, the infrared data are received by the light receptor 30 and then introduced through the interface 14 into the CPU 11, resulting in throttle characteristics being adjusted depending on the data thus transmitted.

Data on the throttle characteristics thus adjusted are then stored in the RAM 12. Subsequently, when the stick 4 for throttling is operated, the CPU 11 carries out encoding corresponding to the amount of operation of the stick 4 based on the data on the adjusted throttle characteristics stored in the RAM 12, to thereby apply a signal of the encoding to the high-frequency circuit 16. Then, the amount of operation of the stick 4 is modulated and then output in the form of a radio wave through the rod antenna 5. The radio wave is then received by a receiver provided on the model, resulting in a throttle of an engine mounted on the model being controlled depending on the adjusted throttle characteristics.

As can be seen from the foregoing, the adjusting device of the present invention constructed as described above permits the amount of operation of a model to be adjusted while controlling the model by means of the radio control transmitter, so that the adjustment may be accomplished while confirming operation of the model. Thus, the present invention significantly reduces a period of time required for carrying out desired adjustment of operation of the model.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A radio control system, comprising:
   a first radio control transmitter, including a first controlling section and a first adjusting section for adjusting the operation of said first controlling section;
   a second radio control transmitter, including a second controlling section and a second adjusting section;
   a cable for connecting said first radio control transmitter and said second radio control transmitter which are physically separated from each other; and
   said second adjusting section being operable to adjust the operation of said first controlling section so that a second operator operating the second adjustable section can adjust the operation of said first controlling section while at the same time, a first operator controls the first controlling section.

2. A radio control transmitter, comprising:
   a transmitter body;
   a controlling section mounted in said body;
   an adjusting section for adjusting the controlling section, detachably mounted in said body;
   means for carrying data between said controlling section and said adjusting section when said adjusting section is mounted in said transmitter body and when said adjusting section is detached therefrom;
   said adjusting section being operated by a second operator when said adjusting section is detached from said transmitter body to adjust the operation of said controlling section at the same time that a first operator operates the controlling section.

3. A radio control transmitter according to claim 2, wherein said means for carrying data is a cable.

4. A radio control transmitter according to claim 2, wherein said means for carrying data is an infrared beam.

* * * * *